United States Patent [19]

Hart

[11] Patent Number: 5,330,201
[45] Date of Patent: Jul. 19, 1994

[54] SEALING ASSEMBLY

[75] Inventor: Brian Hart, Wakefield, England

[73] Assignee: Cooper Industries, Inc., Houston, Tex.

[21] Appl. No.: 864,284

[22] Filed: Apr. 6, 1992

[30] Foreign Application Priority Data

Apr. 9, 1991 [EP] European Pat. Off. ........ 91303094.6

[51] Int. Cl.$^5$ ............................................. F16J 15/48
[52] U.S. Cl. ...................... 277/117; 277/121; 277/165; 277/168; 277/170; 277/190
[58] Field of Search ............ 277/190, 168, 170, 188 A, 277/208, 207 R, 27, 117, 124, 125, 144, 145, 114, 154, 165, 116.2, 116.4, 116.8, 121, 123, 142, 157, 171, 173, 174, 176, 190, 210, 213; 166/118-122

[56] References Cited

U.S. PATENT DOCUMENTS

| | | | |
|---|---|---|---|
| 2,855,051 | 10/1958 | Holloway | 166/118 |
| 3,379,257 | 4/1968 | Tamplen | 166/121 |
| 3,817,517 | 6/1974 | Lundqvist | 277/190 X |
| 4,079,950 | 3/1978 | Langford | 277/207 R X |
| 4,239,124 | 12/1980 | Inouye | 277/190 X |
| 4,252,331 | 2/1981 | Siegel | 277/190 X |
| 4,379,558 | 4/1983 | Pippert | 277/188 A |
| 4,593,914 | 6/1986 | Johnson | 277/165 X |
| 4,901,794 | 2/1990 | Baugh et al. | 166/118 |
| 5,016,524 | 5/1991 | Kawai et al. | 277/168 X |
| 5,127,660 | 7/1992 | Maier | 277/190 X |

FOREIGN PATENT DOCUMENTS

| | | | |
|---|---|---|---|
| 0704518 | 2/1965 | Canada | 277/165 |
| 2610382 | 8/1988 | France | 277/124 |
| 0019416 | of 1897 | United Kingdom | 277/125 |

Primary Examiner—William A. Cuchlinski, Jr.
Assistant Examiner—Scott W. Cummings
Attorney, Agent, or Firm—William B. Patterson; William E. Shull

[57] ABSTRACT

A sealing assembly for sealing between two relatively rotatable cylindrical surfaces. The assembly comprises two seal parts (46, 48) disposed in a groove (40) in one of the surfaces so that one of said parts is disposed radially outwardly of the other. One (46) of the parts is movable axially relative to the other (48) to effect setting of the sealing assembly and the groove (40) and parts (46, 48) are so dimensioned that they become compressed between the surfaces during setting of the assembly. Adjacent surfaces of the seal parts (46, 48) may have inter-engaging profiles (55) which permit relative movement for setting the assembly, but resist movement in the opposite direction.

7 Claims, 2 Drawing Sheets

5,330,201

SEALING ASSEMBLY

BACKGROUND

This invention relates to sealing assemblies for use in sealing between cylindrical surfaces and has particular application to situations where seals are required to carry out a sealing function after they have undergone some rotation. The present sealing assembly has been designed particularly for use in subsea equipment, but its application is by no means limited to that application.

In subsea drilling equipment resilient sealing assemblies are often required at some stage during installation of the equipment to undergo rotation and then subsequently carry out an effective sealing function. An example of this requirement arises with what is known as an external tieback connector which is used to connect tieback equipment to a subsea wellhead assembly. The tieback connector includes a rotatable sleeve which is used to drive an external ring to actuate locking dogs for connecting the tieback connector to the wellhead housing. Seals are provided between the rotatable sleeve and the body of the tieback connector and these seals need to carry out an effective sealing function, both before and after rotation of the sleeve. Typically the seals need to be able to seal against pressures of the order of 10,000 psi. It has been customary to provide resilient seals of the "O" ring or lip seal type, but there have been problems in providing seals which can meet the requirement referred to above. The present invention is concerned with a sealing assembly which has been designed in order to at least alleviate these problems.

SUMMARY

According to the present invention there is provided a sealing assembly for sealing between two relatively rotatable cylindrical surfaces, said assembly comprising two parts disposed in a groove provided in one or both of said surfaces so that one of said parts is disposed radially outwardly of the other, one of said parts being movable axially relative to the other to effect setting of the sealing assembly, and the groove and parts being so dimensioned that the parts become compressed between the surfaces during setting of the sealing assembly. The groove may be configured so that it has a non-uniform depth, one of said seal parts being movable axially in response to fluid pressure from a deeper part of the groove towards a shallower part of the groove in order to effect setting of the seal. Preferably the adjacent surfaces of the seal parts have inter-engaging profiles which permit relative movement in said one axial direction, but resist movement in the opposite direction. The profiles may comprise a plurality of saw-tooth shaped serrations provided on the adjacent surfaces of the seal parts.

The lower surface of the groove may be inclined axially to provide said non-uniform depth. The groove may have an inner and an outer part, the outer groove part having a slightly greater axial extent and being arranged to accommodate the outer seal part which rests upon a step between the outer groove part and the inner groove part.

The outer surface of the outer seal part may be curved prior to setting of the seal assembly. The curvature of the outer seal part may be semicircular in cross-section.

The outer seal part may include anti-extrusion springs on its outer periphery.

The seals may be elastomeric seals.

An object of the present invention is to provide an improved sealing assembly which provides improved sealing and is pressure actuated and locked into sealing position.

Another object of the present invention is to provide an improved sealing assembly which provides an initial seal allowing pressure to set and lock the sealing.

BRIEF DESCRIPTION OF THE DRAWINGS

The invention will be described now by way of example only, with particular reference to the accompanying drawings. In the drawings.

DESCRIPTION OF THE PREFERRED EMBODIMENTS

In the embodiment to be described the sealing assembly is arranged in a tieback connector. It will be appreciated by those skilled in the art that the use of the sealing assembly is by no means limited to such an environment and has much wider application to situations where seals need to be provided between relatively rotatable cylindrical surfaces.

Figure 1:
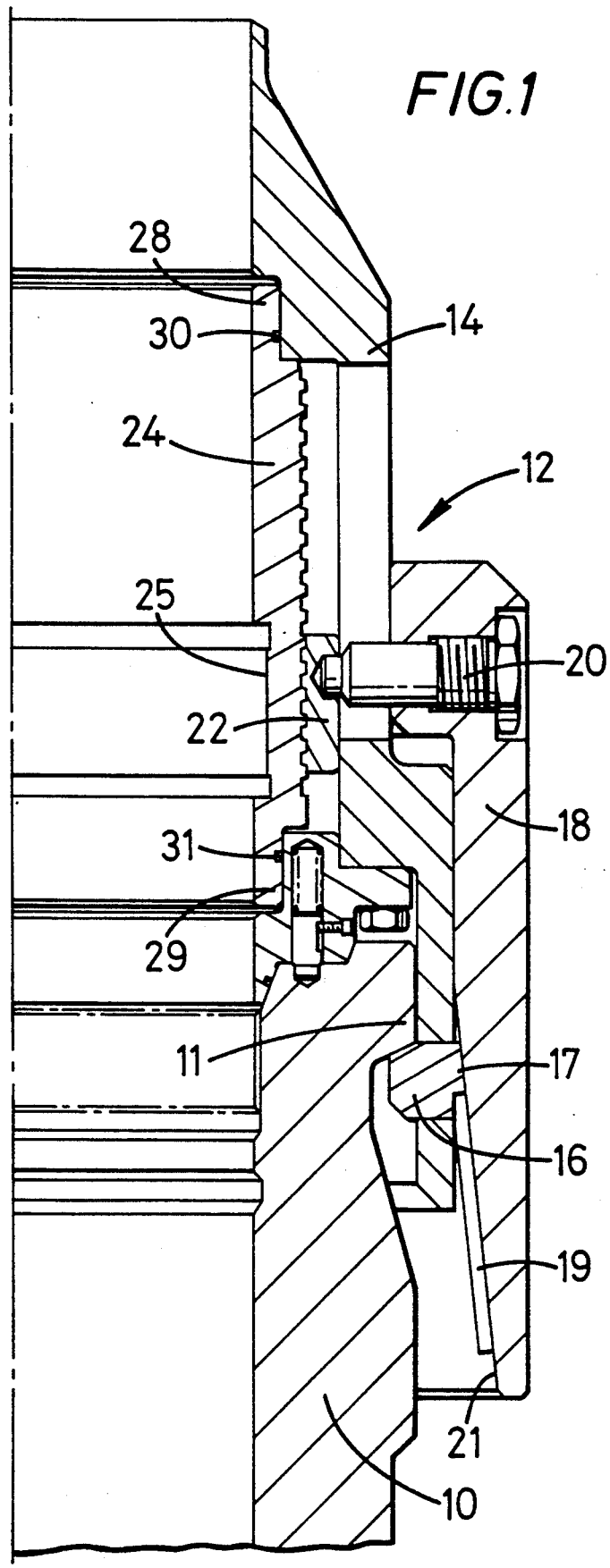
FIG. 1 is a sectional view showing a tieback connector connected to a wellhead housing and incorporating a sealing assembly in accordance with the present invention.

Referring now to FIG. 1 of the drawings there is shown a wellhead housing 10 which typically will be disposed in a wellbore just above the seabed. The upper end of the wellhead housing has a profiled flange 11. Disposed axially above the wellhead housing is a tieback connector 12. The tieback connector includes a generally tubular housing part 14 which carries towards its lower end a series of angularly spaced locking dogs 16. The locking dogs 16 are shown in engagement with the profiled flange 11 formed on the upper end of the wellhead housing 10. The radially outer part of each locking dog 16 has flanges 17 which engage in correspondingly shaped slots 19 formed on an inner tapering surface 21 of an external ring 18. The external ring 18 is movable axially relative to the housing part 14 and in response to such movement the locking dogs 16 move radially inwardly or outwardly as they ride along the ramp defined by the tapering inner surface 21 of the ring 18. The ring 18 carries bolts 20 which extend through axially extending slots in the housing part 14 and engage with a threaded ring 22. The internal threaded surface of the threaded ring 22 engages the external threaded surface of a threaded sleeve 24. The internal surface of the sleeve 24 is generally cylindrical and is provided with recesses 25 which can be engaged by keys on a tool which is lowered into the well and which when in engagement with the slots 25 can cause the sleeve 24 to rotate. The upper and lower ends of the sleeve 24 terminate in thinner parts 28, 29, the outer cylindrical surfaces of which are disposed against inner cylindrical surfaces formed on the connector housing 14 and the ring secured to the lower end of housing 14. Sealing assemblies 30, 31 are provided to seal between these cylindrical surfaces.

It will be appreciated to those skilled in the art that when installing the tieback connector the ring 18 is initially in a position withdrawn axially from the position shown in FIG. 1, so that the locking dogs 16 are in a radially outward position in which they can move over the flange 11. With the components in this position the connector is lowered until it comes into contact with the upper end of the wellhead housing 10. A tool is then lowered to a position within the bore defined by the tieback connector so that it engages in the slots 25. The tool then causes the sleeve 24 to rotate which by way of the ring 22 and the bolt 20 causes the ring 18 to move axially downwardly. By virtue of the sloping surface 21 on the interior of the ring 18, the dogs 16 are caused to move radially inwardly to the position shown in FIG. 1 so that the tieback connector is retained in the position shown by interengagement of the locking dogs 16 with the flange 11.

The sealing assemblies 30 and 31 carry out a sealing function both before rotation of the sleeve 24 and after that rotation. A sealing assembly is shown in more detail in FIG. 2 of the drawings.

Each sealing assembly is disposed within a groove 40 formed in the outer cylindrical surface of the sleeve 24. The groove has an outer annular part 41 and an inner annular part 42 whose axial extent is slightly less than the outer part 41 so that a step 43 is defined between the two parts. Additionally the inner wall 44 of the groove is inclined relative to sleeve axis tapering axially away from the axis in a direction away from the end of sleeve 24 in which the groove is positioned.

The inner part 42 of the groove accommodates a first or inner seal part 46 whose axial extent is less than the axial extent of the groove part 42. The seal part 46 is generally annular, its radially inner surface sloping at an angle corresponding to that of the inner wall 44 of the groove 40. The seal parts are resilient and are formed from an elastomer, e.g. a rubber of the Nitrile family or PTFE.

Figure 2A:
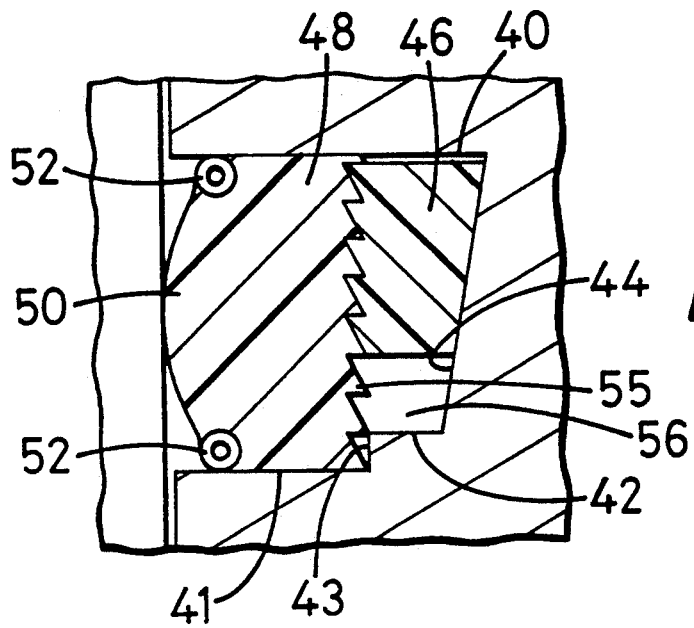
FIGS. 2A and 2B are detailed sectional views showing a sealing assembly in accordance with the present invention.
Figure 2B:
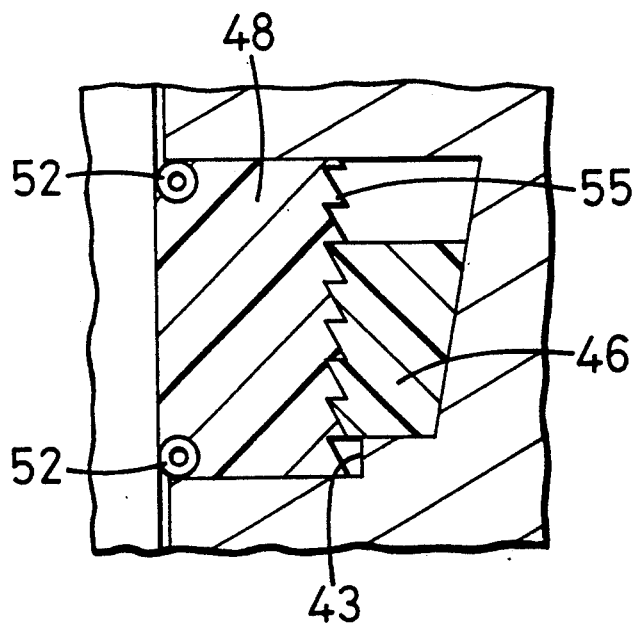

The radially outer part of the groove 41 accommodates outer seal part 48 whose axial extent is substantially the same as the axial extent of the groove part 41. Outer seal part 48 is generally annular and its radially outer part has a circumferentially extending protrusion 50 which is generally semicircular in profile, as seen in FIG. 2A. Additionally the outer peripheral parts of the outer seal part 48 incorporate anti-extrusion springs 52. As shown in FIGS. 2A and 2B, groove 40 can be in either the exterior surface of sleeve 24 or the interior surface of housing 14 and the ring connected to the lower end of housing 14.

The adjacent surfaces of the seal parts 46 and 48, that is the inner surface of the outer seal part 48 and the outer surface of the inner seal part 46, are formed with interengaging serrations shown at 55. In cross section the serrations are saw-tooth shaped and are so arranged that inner seal part 46 can, in response to pressure applied from its upper portion as seen in FIG. 2A, move axially towards the lower portion of the drawing with the ramps of the serrations as shown in FIG. 2B. Movement in the opposite direction is resisted by the interengaging radially extending surfaces of the serrations.

In use of the sealing assembly when the tieback connector is lowered into the well bore prior to attachment of the connector to the wellhead housing 10, each sealing assembly is in its running or unset position shown in FIG. 2A. In this condition by virtue of the dimensions of the seal parts they are subjected to a small squeeze of approximately 3% so that they carry out a limited sealing function during this step of operation. The sealing parts remain in the position shown in FIG. 2A until the tieback connector has been locked on to the wellhead housing by interengagement of the locking dogs 16 with the flange 11.

Subsequently the sealing assembly is caused to assume its set position in response to the application of pressure within the well bore. When such pressure is applied the inner sealing part 46 is caused to move axially downwardly as viewed in FIG. 2A so that the seal part moves to the position shown in FIG. 2B. Because of the sloping wall 44 of the groove 40 which defines a taper the sealing parts are compressed as the inner sealing part undergoes this movement. As can be seen in FIG. 2B the outer seal part 48 becomes compressed so that the outer profile is collapsed and the outer surface of the outer seal part becomes flush with the inner cylindrical surface on the housing 14 of the tieback connector. When the inner seal part has been moved to the position shown in FIG. 2B the seal is in its set position and movement back along the groove 40 is resisted by interengagement of the radially extending surfaces of the serrations 55 formed on the mating surfaces of the seal parts.

It will also be noted that the step 43 formed in the groove acts to support the outer seal 48 during application of the pressure and prevents the seal part 48 from moving into the space 56 between inner seal part 46 and inner wall 44 of the groove 40 and the surface of inner annular part 42 of groove 40.

The sealing assembly shown in the drawings has the advantage that it can carry out an effective sealing function both before and after relative rotation of the parts between which it is sealing.

What is claimed is:

1. A sealing assembly for sealing between two relatively rotatable cylindrical surfaces, comprising:
    a groove in at least one of said cylindrical surfaces, said groove having an inner wall,
    a radially outer seal part and a radially inner seal part disposed in said groove so that said radially outer seal part is disposed radially outwardly of said radially inner seal part, said radially outer seal part having a radially outer seal face adapted to sealingly engage one of said surfaces and a radially inner face adapted to engage said radially inner seal part, said radially inner seal part having a radially inner seal face adapted to sealingly engage the other of said surfaces and a radially outer face adapted to engage said radially outer seal part, said radially inner seal part being disposed between said radially inner face of said radially outer seal part and said inner wall of said groove,
    said groove being configured so that it has a non-uniform radial depth,
    said radially inner seal part being movable axially relative to said radially outer seal part in response to fluid pressure from a radially deeper portion of said groove towards a radially shallower portion to effect setting of the sealing assembly,
    said groove and said seal parts being so dimensioned that said seal parts become compressed between the surfaces during setting of the sealing assembly, and
    cooperable means disposed on said radially outer seal part and said radially inner seal part for preventing substantial release of compression of said seal parts once the sealing assembly has been set.

2. A sealing assembly according to claim 1, wherein the radially inner face of said outer seal part and the radially outer face of said inner seal part have interengaging profiles which permit relative movement in a first axial direction for setting the seal assembly, but resist axial movement in a second axial direction opposite said first axial direction.

3. A sealing assembly according to claim 2, wherein the interengaging profiles comprise a plurality of sawtooth shaped serrations provided on the radially inner face of said outer seal part and the radially outer face of said inner seal part.

4. A sealing assembly according to claim 1, wherein said inner wall of said groove is inclined axially to provide said non-uniform depth.

5. A sealing assembly according to claim 1, wherein the groove has a radially inner and a radially outer portion with a step therebetween, the radially outer groove portion having a slightly greater axial extent and being arranged to accommodate the radially outer seal part which rests upon the steps between the radially outer groove portion and the radially inner groove portion.

6. A sealing assembly for sealing between two relatively rotatable cylindrical surfaces, comprising:

a groove in at least one of said cylindrical surfaces, said groove having an inner wall, a radially outer seal part and a radially inner seal part disposed in said groove so that said radially outer seal part is disposed radially outwardly of said radially inner seal part, said radially outer seal part having a radially outer seal face adapted for sealing along one of said surfaces and said radially inner seal part having a radially inner seal face adapted for sealing along the other of said surfaces, said groove being configured so that it has a non-uniform radial depth, said radially inner seal part being movable axially relative to said radially outer seal part in response to fluid pressure from a radially deeper portion of said groove towards a radially shallower portion to effect setting of the sealing assembly, said groove and said seal parts being so dimensioned that said seal parts become compressed between the surfaces during setting of the sealing assembly, and wherein the radially outer seal part includes anti-extrusion means on its outer periphery.

7. A sealing assembly according to claim 6, wherein the seal parts are formed from an elastomer.

* * * * *